3,053,782
WATER SOLUBLE POLYESTER AND AQUEOUS SOLUTION OF SAME

Thomas A. Shelby, Scranton, Pa., assignor to Standard Oil Company, Chicago, Ill., a corporation of Indiana
No Drawing. Filed Mar. 28, 1960, Ser. No. 17,757
6 Claims. (Cl. 260—29.2)

This invention relates to water soluble polyester resins characterized by thermosetting properties.

Extremely good quality thermosetting resins made from benzene tricarboxylic acid, aliphatic dicarboxylic acid and aliphatic polyol are now available in water soluble forms. These resins are baked at temperatures on the order of 400° F. In general, these resins produce surface coatings which are low in resistance to aqueous alkali solutions. It is, therefore, the principal object of this invention to provide a resin composition of the above type which possesses improved alkali resistance. Other objects will become apparent in the course of the detailed description of the invention.

In the composition of the invention, the resin progenitor of the water soluble resinous material consists of the polyester condensation reaction product of a trimellitic acid or anhydride, of adipic acid, of glycol containing 3 to 5 carbon atoms, of glycerol and butylbenzoic acid. The water soluble resinous product consists of the polyester condensation reaction product resin reacted with an alkaline substance to obtain water solubility at a pH between about 5 and 8. The hereinafter defined water soluble resinous product component of the composition of the invention is characterized by the ability to form a thermoset solid upon air-baking at a temperature on the order of 400° F.

The resin polyester condensation reaction product is prepared by poly-condensing the defined reactants at elevated temperatures, for example, about 300°–400° F., while continuously removing the water formed in the reaction. The polyester condensation reaction is well known and it is not necessary to describe it in detail herein.

Trimellitic anhydride is the preferred tricarboxylic acidic member.

The reaction requires the presence of a glycol containing 3–5 carbon atoms. Examples of suitable glycols are propylene glycol, 1,3-butanediol, diethylene glycol, trimethylol ethane, and neopentyl glycol.

The reaction requires the presence of adipic acid and also glycerol.

Also a butylbenzoic acid is required—p-tert-butylbenzoic acid is preferred.

The characteristics of the resin polyester condensation reaction product is dependent upon the type of reactants, and upon the mole ratios existing among the reactants. In general, the overall mole ratio of carboxyl groups to hydroxyl groups in the condensation zone should be about 1:1.5–1.8. When the trimellitic member has a mole presence of 3, the other reactants will fall in the usage of: adipic acid, 0.5–1.5; glycol, 2–7; glycerol, 1–5; butylbenzoic acid, 0.5–1.5.

The polyester condensation reaction product desirably is prepared under conditions of reaction such that the resin has an acid number the lowest possible commensurate with avoiding gelation. In general, the acid number of the polyester product will be between about 20 and 100. (It is to be understood that not all combinations of the defined reactants can produce an acid number as low as 20, however.) The resin polyester products are soluble in oxygenated solvents such as alcohols and ketones and mixtures of these with benzene hydrocarbons.

The resin polyester condensation reaction products range from very viscous liquids to hard solids in appearance. These polyester products possess the common characteristic of forming "rigid" solids when baked at temperatures on the order of 400° F. in the presence of oxygen or air. The degree of baking (curing) time needed to obtain a thermoset material will depend upon the particular polyester product. In general, these products form thermoset materials at 400° F. in times ranging from 15 minutes to 1 hour. These polyester resins will cure to thermoset materials at lower temperatures, but require much longer times.

The water soluble resin consists essentially of the resin produced by the reaction of the polyester condensation reaction product and an alkaline reacting material. The resin product and the alkaline material are reacted until a water soluble resinous product is obtained. The amount of alkaline reacting material is most readily determined by following the pH of the reaction medium. An aqueous reaction medium is preferred when the water soluble resinous product is to be used for surface coating applications because the desired water solution is obtained immediately. When the resin product and aqueous reaction medium are contacted in the presence of an alkaline reacting material, the resinous product passes into solution substantially completely at a pH of about 5. In practically all instances, the resinous product will be in complete solution at a pH of about 6. The use of alkaline reacting material in excess of that needed to bring all the polyester product into solution is not harmful, at least up to a water solution pH of about 8. It is preferred to have the aqueous solution somewhat on the acid side or neutral, i.e., a pH of from 6 to 7.

The alkaline reacting material may be any material which reacts with acidity to produce a more neutral product. Ammonia (as the hydroxide) and alkali metal hydroxides are particularly suitable when aqueous reaction medium is desired. The hydrocarbon amines, particularly the lower molecular weight containing not more than 4 carbon atoms in each aliphatic group, are suitable. The amine aliphatic alcohols, such as ethanolamines, are suitable. The heteroamines, such as morpholine, pyridine, and piperidine may be usable. The type of alkaline reacting material used is determined in part by the characteristics desired in the final water soluble resin; also, by the type of resin product which is to be converted to a water soluble form. Preferred materials are aqueous amomnia, the lower molecular weight amines, such as ethylamines and butylamines and morpholine and ethanolamine.

The neutralization reaction is carried out by contacting the resin product and the alkaline reacting medium, when necessary in the presence of a liquid reaction medium; particularly suitable reaction mediums are oxygenated organic solvents and water. When water is used as the liquid reaction medium, it is preferred that it be warm, i.e., maintained in the region of 100–160° F.; the resin product is added to the aqueous alkaline reaction material and the two agitated until the resinous product has passed into solution. Ammonium hydroxide solution is a particularly suitable aqueous alkaline medium. The water solutions of the water soluble resinous products are clear liquids usually containing some opalescent appearance; the solutions may be colorless or colored, depending on the particular water soluble resin present.

The water soluble resinous product behaves in essentially the same manner as the resin product when exposed to oxygen or air at elevated temperatures in that an air-baked or cured thermoset solid is formed. At temperatures on the order of 400° F., the water soluble resin produces hard films on metal surfaces in times of 15 minutes to 1 hour.

In addition to their high solubility in water, which may be as much or more than 50 percent by weight, the water soluble resins are also soluble in the ordinary oxygenated organic solvents. Because of its cheapness and safety, water is the preferred solution for surface coating applications and also as reaction medium.

The water soluble composition may be recovered from the reaction medium and used for the preparation of thermoset solids. The compositions of the invention have utility in the broad field of rigid plastics now occupied by materials such as phenol formaldehyde resins and filled melamine-formaldehyde resins. They may also be used as binders for laminations such as plywood forming and fiber glass reinforced plastics. In both of these uses, the compositions of the invention are particularly good because no curing agent need be added in order to obtain good rigidity or suitably short curing times. For surface coating purposes, the solid water soluble composition is preferably dissolved in a sufficient amount of water to produce the desired viscosity for the particular application.

*Illustration*

Following is an example of this reaction: 312 grams of neopentyl glycol and 19 grams of propylene glycol were heated to 340° F. Trimellitic anhydride (288 grams) was added slowly over a period of 5 min. at 340° F. Fifteen minutes later 46 grams of glycerin and 89 grams of tert-butylbenzoic acid were added at 340° F. and the resin was cooked under an inert gas sparge until it was clear. At this point, 73 grams of adipic acid was added and the whole was cooked at 340° F. to an acid value of 47. The resin was brought into water solution with 28% aqueous ammonia, at a pH of 6 for a 28% solid solution.

Tin plate was coated with films from this aqueous solution. The plates were baked at 400° F. for 30 minutes to give cured films about 1 mil thick. Tests of the plates showed:

2% NaOH resistance _____ 28 hrs.
Cold $H_2O$ resistance _____ >24 hrs.
Impact resistance _____ >80 in.-lbs.
Flexibility, ⅛" rod _____ No break.
Mar resistance _____ No mark with fingernail.
Hardness _____ No scratch with fingernails.

Thus having described the invention, what is claimed is:

1. A water-soluble composition consisting essentially of the water soluble resinous reaction product of (A) an alkaline substance with (B) a resin consisting essentially of the polyester condensation reaction product of (a) a tricarboxylic acidic member selected from the group consisting of trimellitic acid and trimellitic anhydride, (b) adipic acid (c) alkylene glycols containing 3–5 carbon atoms, (d) glycerol, and (e) butylbenzoic acid, where the molar proportions of reactants charged are: acidic member, 3; adipic acid, 0.5–1.5; glycol, 2–7; glycerol, 1–5; and butylbenzoic acid, 0.5–1.5, wherein the mole ratio of total hydroxyl groups to total carboxyl group is about 1.5–1.8:1, which resin is characterized by an acid number of about 20 and 100 and by solubility in oxygenated organic solvents, said water-soluble reaction product being further characterized by a water solution pH of between about 5 and 8 and the ability to form a thermoset solid on baking at about 400° F.

2. The water-soluble composition of claim 1 wherein said alkaline substance is ammonia.

3. The water-soluble composition of claim 1 wherein said acidic member is trimellitic anhydride.

4. The water-soluble composition of claim 1 wherein said benzoic acid is p-tert-butylbenzoic acid.

5. The water-soluble composition of claim 1 wherein said glycol is neopentyl glycol.

6. A liquid composition consisting essentially of the water-soluble composition of claim 1 and sufficient amount of water to dissolve said composition.

References Cited in the file of this patent
UNITED STATES PATENTS

| | | |
|---|---|---|
| 1,975,246 | Zwilgmeyer | Oct. 2, 1934 |
| 2,562,878 | Blair | Aug. 7, 1951 |